(12) United States Patent
Nakajima et al.

(10) Patent No.: US 6,243,421 B1
(45) Date of Patent: *Jun. 5, 2001

(54) APPARATUS FOR DECODING CODED VIDEO DATA WITH REDUCED MEMORY SIZE

(75) Inventors: Yasuyuki Nakajima, Saitama; Kiyono Ujihara, Tokyo, both of (JP)

(73) Assignee: Kokusai Denshin Denwa Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/798,433

(22) Filed: Feb. 10, 1997

(30) Foreign Application Priority Data

Mar. 4, 1996 (JP) .................................................. 8-070943

(51) Int. Cl.$^7$ ...................................................... H04N 7/12
(52) U.S. Cl. .................................. 375/240.25; 375/240.21
(58) Field of Search ........................... 348/399, 400–401, 348/403, 404–406, 408, 409, 415, 420, 845.2, 427, 424, 424.1, 425.1, 405.1; 375/240.25, 240.21, 240.2, 240.16; 386/111; 382/236, 238

(56) References Cited

U.S. PATENT DOCUMENTS

| | | | | |
|---|---|---|---|---|
| 4,504,860 | * | 3/1985 | Nicol et al. | 348/406 |
| 5,253,055 | * | 10/1993 | Civanlar et al. | 348/415 |
| 5,270,813 | * | 12/1993 | Puri et al. | 348/415 |
| 5,278,646 | * | 1/1994 | Civanlar et al. | 348/415 |
| 5,581,302 | * | 12/1996 | Ran et al. | 348/424 |
| 5,644,361 | * | 7/1997 | Ran et al. | 348/424 |
| 5,708,732 | * | 1/1998 | Merhav et al. | 348/399 |
| 5,742,343 | * | 4/1998 | Haskell et al. | 348/415 |
| 5,742,892 | * | 4/1998 | Chaddha | 348/400 |
| 5,777,677 | * | 7/1998 | Linzer et al. | 348/397.1 |
| 5,847,762 | * | 12/1998 | Canfield et al. | 348/415.1 |

OTHER PUBLICATIONS

Iwahashi et al, "Design of Motion Compensation Filters of Frequency Scalable Coding—Drift Reduction—", IEEE, pp. 277–280.*

"A Drift Free Scalable Decoder", Technical Report of IEICE (Shingaku Giho, DSP 94–108), by Masahiro Iwahashi et al., Jan. 26, 1995, pp. 63–70, (translation of Abstract).

* cited by examiner

*Primary Examiner*—Vu Le
(74) *Attorney, Agent, or Firm*—Westman, Champlin & Kelly, P.A.

(57) ABSTRACT

An apparatus for decoding coded video data is provided which is capable of decreasing the storage size of its frame memory while attenuating the drift noise and minimizing lowering of the resolution during the reconstruction of the coded video data. The apparatus comprises a data size reducer for reducing the size of a decoded video data reconstructed by subsampling, pixel differential coding, or other methods, a frame memory for saving a reduced video data released from the data size reducer, and a data size recover for recovering the original size of the decoded video data from the reduced data saved in the frame memory. Accordingly, the storage size of the frame memory is decreased by a combination of compression of pixel data and IDCT processing in a reduced block size and will successfully attenuate unwanted drift noise and minimize declination of the resolution.

10 Claims, 5 Drawing Sheets

APPARATUS FOR DECODING CODED VIDEO DATA WITH REDUCED MEMORY SIZE

BACKGROUND OF THE INVENTION

1. Field of the Invention

The present invention relates to an apparatus for decoding coded video data and particularly, to a coded video data decoder in which video data of e.g. MPEG2 coded format is decoded with a frame memory minimized in the storage size.

2. Description of the Related Art

Among various methods of minimizing the storage size of a frame memory in decoding of coded video data is a scalable decoder (FIG. 1) such as depicted in "Scalable decoder without low-frequency drift" by Iwahashi et al, (Singaku Giho, DSP94-108). The scalable decoder is a device for decoding a part of coded data and thus allows the storage size of a frame memory to be decreased with the use of IDCT (inverse discrete cosine transform) with a low degree as shown.

Figure 1:
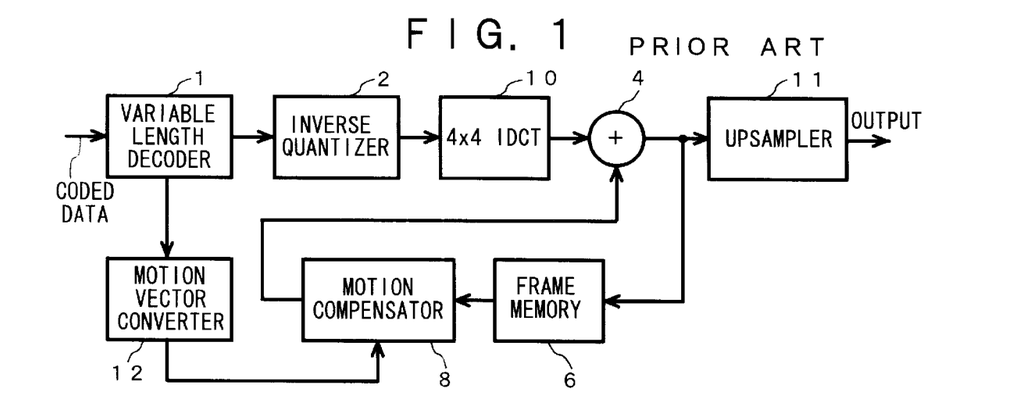
FIG. 1 is a block diagram showing a decoder of the prior art.

Video data of e.g. MPEG2 coded format is variable length decoded by a variable length decoder 1 and resultant quantized DCT coefficients are inverse quantized by an inverse quantizer 2 to produce 8×8 DCT coefficients. When 4×4 DCT coefficients in the 8×8 DCT coefficients are subjected to two-dimensional IDCT process of a 4×4 IDCT 10, video data consisting of 4×4 pixels is reconstructed which is ½ of the original video data in both the horizontal and vertical directions. If a block to be decoded is motion compensation blocks, the motion compensation blocks are supplied from a motion compensator 8 and added to the 4×4 pixel data for reproducing decoded video data. The decoded video data is ½ of the original size in both the horizontal and vertical directions and enlarged by an upsampler 11 before stored at the succeeding step in a sequence in a memory, not shown, for display.

Also, the decoded video data is stored in a frame memory 6 of which storage size is ¼ of the original size because the data to be stored is ½ of the original size in both the horizontal and vertical directions. For carrying out a motion compensation process in a reduced space, a motion vector converter 12 is provided for converting a motion vector to ½ in both horizontal and vertical and extracting its corresponding blocks from the frame memory 6. If the two-dimensional IDCT process is executed with 4×4 IDCT in the horizontal direction and 8×8 IDCT in the vertical direction, the decoded video data and the frame memory are ½ of the original size.

The foregoing conventional method is capable of reducing the frame memory size by changing IDCT size but may create drift noise due to inconformity of a predictive image between the coding side and the decoding side and lower the quality of a reconstructed image. Also, the resolution of the reconstructed image will be as low as ½ or ¼ of the original.

SUMMARY OF THE INVENTION

It is an object of the present invention, for solving the conventional problems, to provide an apparatus for decoding coded video data which is capable of decreasing the storage size of its frame memory while attenuating the drift noise and minimizing lowering of the resolution during the reconstruction of the coded video data.

The present invention is implemented by a data size reducing means for reducing the size of a decoded video data reconstructed by subsampling, pixel differential coding, or other means, a frame memory for saving a reduced video data released from the data size reducing means, and a data size recovering means for recovering the original size of the decoded video data from the reduced data saved in the frame memory or saving means.

According to the present invention, the storage size of the frame memory is decreased by a combination of compression of pixel data to be saved in the frame memory without or with lowering its quality to a minimum and IDCT processing in a reduced block size and will successfully attenuate unwanted drift noise and minimize declination of the resolution as compared with the conventional frame memory size reducing methods.

DETAILED DESCRIPTION OF THE PREFERRED EMBODIMENTS

Figure 2:
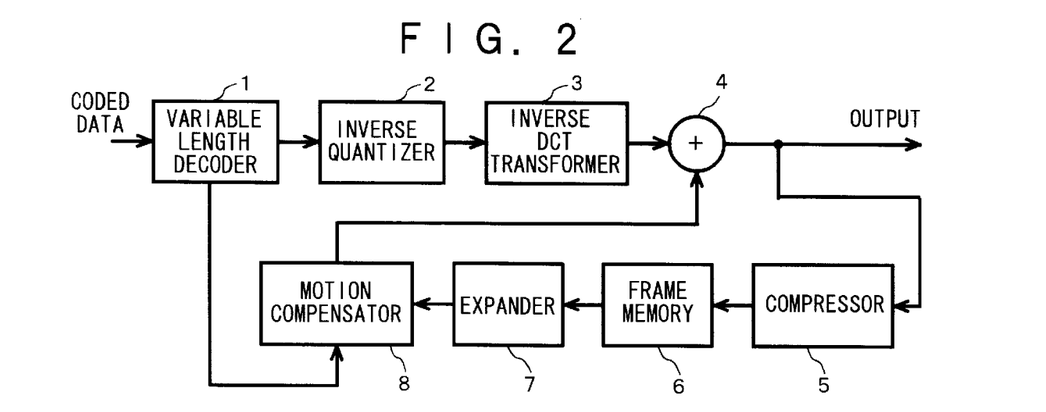
FIG. 2 is a block diagram of a first embodiment of a decoder according to the present invention.

The present invention will be described in more details referring to the accompanying drawings. FIG. 2 is a block diagram of a coded video data decoder showing a first embodiment of the present invention. A coded data input of video data of e.g. MPEG2 format is variable length decoded by a variable length decoder 1 and resultant quantized DCT coefficients are inverse quantized to N×N DCT coefficients by an inverse quantizer 2. In the MPEG format, N is eight. The DCT coefficients are then fed to an inverse DCT transformer 3 where they are converted to N×N pixels of differential pixel data. The differential pixel data is added by an adder 4 with an image data derived from a frame memory 6 to produce a decoded video data. When a block data input to be decoded is motion compensation blocks, a motion compensator 8 reads necessary blocks from the frame memory 6 for motion compensation. The reconstructed decoded video data is sequentially stored in a display memory, not shown, at the succeeding step prior to display.

Also, the decoded video data is compressed once again by a compressor 5 and saved in the frame memory 6. A compressed video data when requested for the motion compensation is read out and its pixel data in necessary is decoded by an expander 7 and transmitted to the motion compensator 8. It is one feature of the present invention to compress the decoded video data before storing it in the frame memory which can be thus decreased in the storage size.

Figure 3:
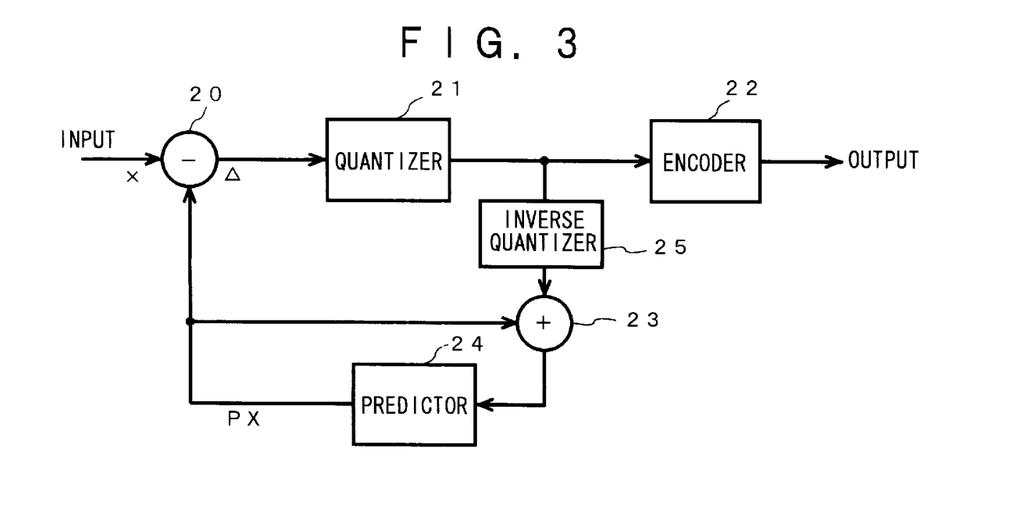
FIG. 3 is a block diagram of a compressor shown in FIG. 2.

FIG. 3 is a block diagram showing a construction of the compressor 5. In the compressor 5, the video data is first fed to a subtractor 20 where it is subtracted by a predictive data supplied from a predictor 24 to produce a predictive difference $\Delta$ which is then quantized by a quantizer 21. A quantized data is decoded by a local decoder composed of an adder 23 and the predictor 24. Assuming that the video data of interest is X and the predictive data is PX, the difference is expressed by:

$$\Delta = X - PX$$

Figure 5A:
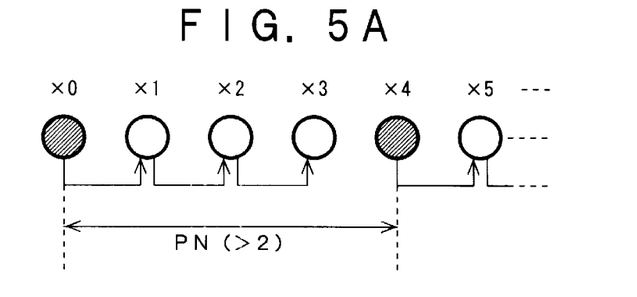
FIGS. 5A to 5C are explanatory views showing predictive methods for determining a predictive value PX.
Figure 5B:
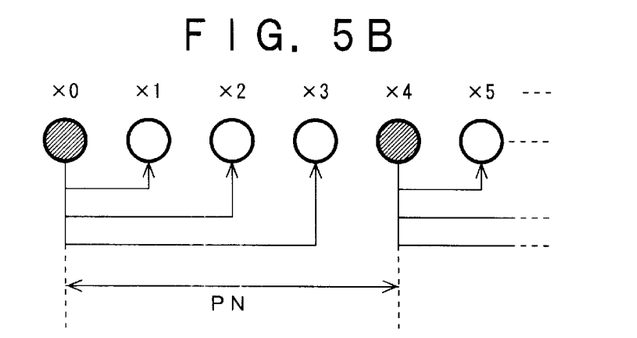
Figure 5C:
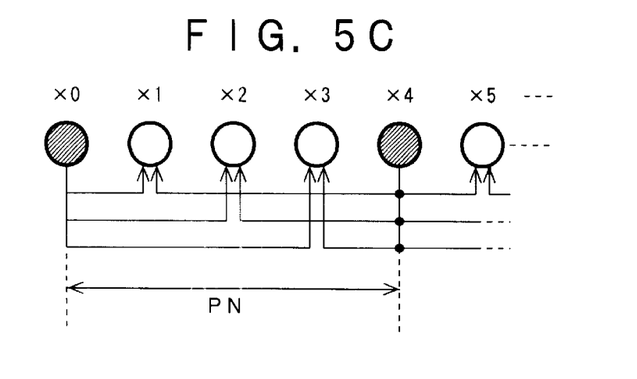

PX can be calculated by various methods. FIGS. 5A to 5C illustrate some of the methods of determining the predictive data PX, in which pixels are aligned in horizontal. The prediction is then explained with the pixels of a horizontal row. Also, the shaded pixels represent pixels to be directly encoded without using any predictive data and the not shaded, white pixels are to be compression encoded by a predictive coding. For the motion compensation, the frame memory has to be random accessed for retrieval of required blocks. The random access may be performed by differential encoding with the pixels without prediction, which are saved in every given length of period.

FIG. 5A shows a predictive coding method using each neighbor pixel on the left. If the predictive data of a pixel X1 is PX1, the difference $\Delta 1$ to be encoded is given from:

$$PX1 = X0, \Delta 1 = X1 - X0$$

The succeeding pixel X2 is then processed with the use of a predictive coded, locally reconstructed data of X1 (referred to as RX1). If the predictive data of X2 is PX2, the difference $\Delta 2$ is calculated from:

$$PX2 = RX1, \Delta 2 = X2 - RX1$$

It is noted that every PNth pixel is encoded without predictive data. PN is an integer greater than 2 and if it is an infinite number, the first pixel only is encoded without using the predictive coding.

FIG. 5B illustrates another predictive coding method with the use of a pixel data encoded without prediction. As shown, pixels X1, X2, and X3 are predicted from X0. For example, if the predictive data of the pixel X3 is PX3, the difference $\Delta 3$ is calculated from:

$$PX3 = X0, \Delta 3 = X3 - X0$$

Also, every PNth pixel is encoded without using the predictive coding.

FIG. 5C shows a further predictive coding method in which two or more decoded pixels are used for prediction. For example, X1 is predicted from a combination of X0 and X4 allocated in horizontal. The predictive pixel PX1 is expressed by:

$$PX1 = \alpha X0 + \beta X4$$

where $\alpha$ and $\beta$ are weighted coefficients which may be $\alpha = \beta = \frac{1}{2}$ for determining a simple average or $\alpha = \frac{3}{4}, \beta = \frac{1}{4}$ for calculating a weighted mean value in accordance with the distance between two pixels.

Figure 6:
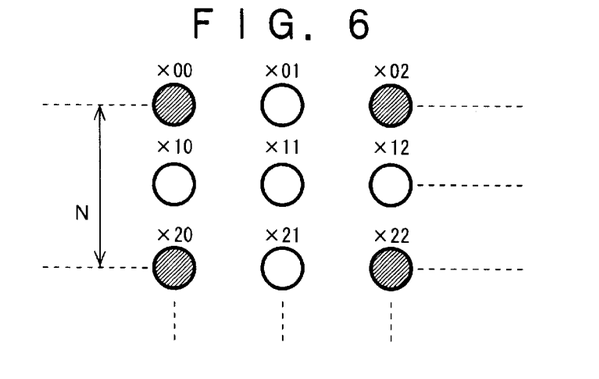
FIG. 6 is an explanatory view showing an example of the predictive method of FIG. 5C in a two-dimensional space.

The above methods may be utilized with respect to not only the horizontal direction but also the vertical direction or a diagonal direction. FIG. 6 is an explanatory view showing the predictive coding method of FIG. 5C applied to a two-dimensional space, in which X00, X02, X20, and X22 are pixels to be encoded without prediction. Using the predictive coding method, X01 is predicted from X00 and X02 located on the same horizontal row. Also, X10 is predictive coded using X00 and X20, and X11 is predicted from X00 and X22 which are aligned diagonally. In the same way, FIG. 5A and FIG. 5B can be applied to a two-dimensional space.

Figure 7:
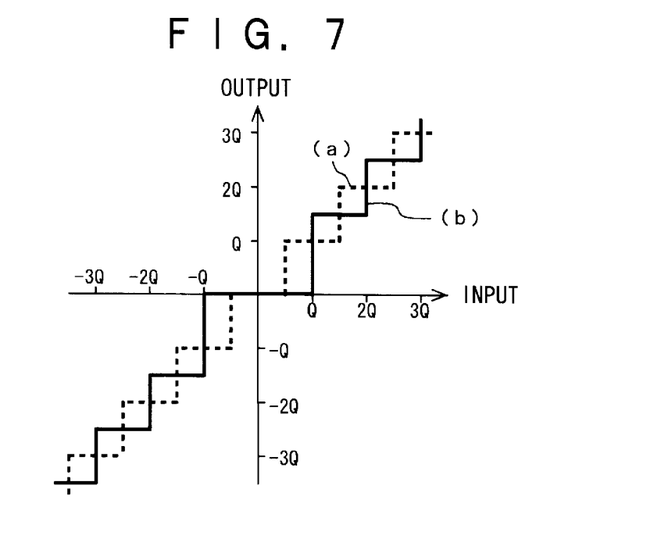
FIG. 7 is a graphic diagram showing an example of characteristics of the quantizer 21.

FIG. 7 is a graphic diagram showing functional characteristics of the quantizer 21, in which X axis represents an input level and Y axis is an output level. Q is a step size of quantization. The characteristic denoted by the dotted line (a) in FIG. 7 is of linear quantization, in which assuming that the input is X and the output or quantized representative is Y, Y=Q is established when $(Q/2) \leq X < (3Q/2)$. The real line (b) of FIG. 7 is of dead-zone type linear quantization commonly used for MPEG format, in which the output is 0 when the input is $\pm Q$. The quantizer 21 may be utilized of a non-linear type as well as other linear types. It is also possible that the quantization is applied depending on the classification of pixels. For example, the pixels to be encoded without prediction as shown in FIG. 3 are not subjected to the quantization but directly transmitted towards the output.

The encoder 22 may be either a fixed length encoder or a variable length encoder used for MPEG format. In case of the fixed length encoder, a 6-bit data is produced from 64 quantized values. Also, encoded data is reduced by the complement of 2. For example, when 8-bit data is entered with the predictive difference $\Delta$ of −255 to +255 at the quantization step Q of 4, 127 qunatized values are produced including −252, −248 ... , 0, ... , 248, and 252. The 127 values can be expressed in the 7-bit format.

It is now noted that the predictive difference $\Delta$ of a pixel X is within a dynamic range of 256. Therefore, the quantized output is represented by 64 different values which can be expressed in the 6-bit format. If P=0, X is within a range from 0 to 255. Hence, $\Delta = X - P$ ranges 0 to 255. If P=255, $\Delta$ ranges −255 to 0. As $\Delta$ stays in the dynamic range of 256, the quantized output is expressed by 64 values at the quantization step Q of 4.

Figure 4:
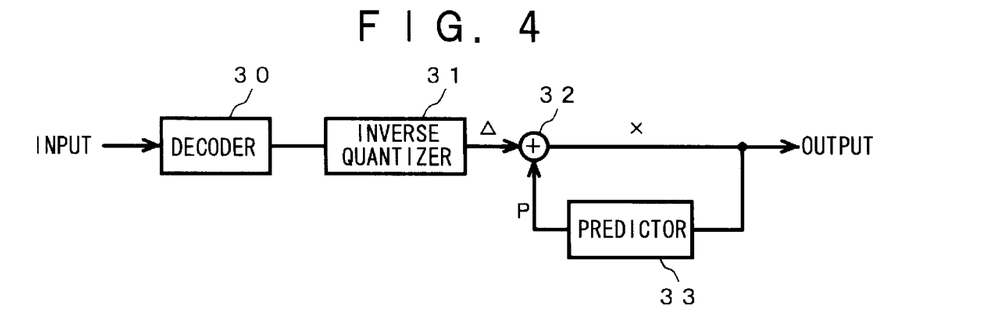
FIG. 4 is a block diagram of an expander shown in FIG. 2.

FIG. 4 is a block diagram showing a construction of the expander 7 of FIG. 2. The compressed pixel data derived from the frame memory 6 is fed to a decoder 30 where it is subjected to an inverse of the coding action of the encoder 22 of FIG. 3 for reconstructing a quantized data from the fixed or variable length code form. The quantized data is inverse quantized by an inverse quantizer 31 reproducing a predictive difference $\Delta$. If the quantization denoted at (a) in FIG. 7 is involved, the quantized values are 0, Q, 2Q, and so on. Accordingly, the quantized data of 0, 1, ... , 63 at the quantization step Q of 4 are converted to 0, 4, 8, 12, ..., 252 of $\Delta$ respectively.

The predictive difference $\Delta$ is combined with a predictive value P by an adder 32 to decode the pixel X which is equal to P+$\Delta$. A predictor 33 may be identical in construction to the predictor 24 of FIG. 3. The inverse quantization may be an inverse of the linear or non-linear quantization process shown in FIG. 7.

Figure 8:
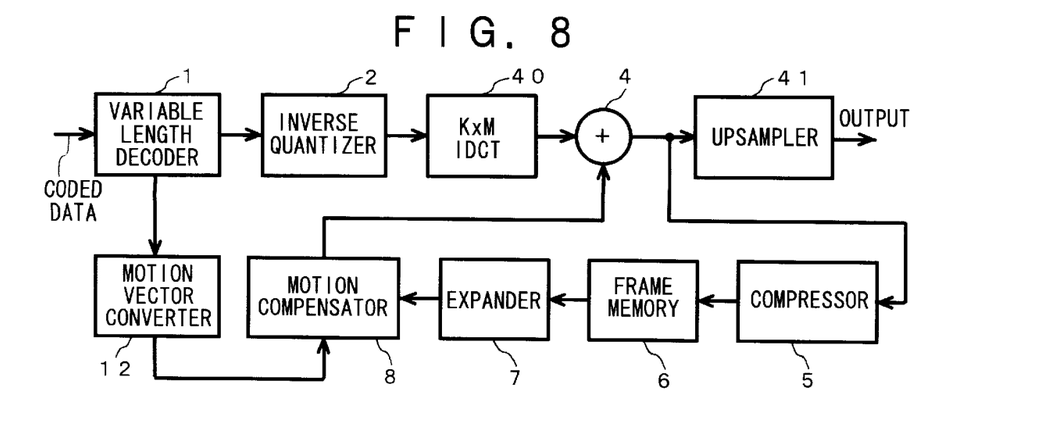
FIG. 8 is a block diagram of a second embodiment of the decoder according to the present invention.

A second embodiment of the present invention will now be described. FIG. 8 is a block diagram of a decoder of the second embodiment. Video data encoded of e.g. MPEG2 format is variable length decoded by a variable length decoder 1 and quantized DCT coefficients are inverse quantized by an inverse quantizer 2 to produce N×N DCT coefficients. The N×N DCT coefficients are then fed to a K×M inverse DCT transformer 40 where their low-frequency or K×M component (K, M≦N) is subjected to K×K IDCT process in the horizontal direction and M×M IDCT process in the vertical direction, thus reconstructing a K×M pixel data. If the motion block data to be decoded is motion compensation blocks, the K×M data is combined by an adder 4 with motion compensation block data derived from a motion compensator 8.

A resultant decoded video data is compressed again by a compressor 5 and stored in a frame memory 6. When the blocks are requested for motion compensation, their compressed data is decoded by an expander 7 and subjected to the motion compensation of a motion compensator 8. Motion vectors MV from the variable length decoder 1 are however subjected to the motion compensation by a motion vector converter 12 where motion vectors MV' scaled down to K/N in the horizontal direction and M/N in the vertical direction are used. The decoded video data is converted by a upsampler 41 to a desired size. For example, when the decoded video data is scaled to N/K and N/M in the vertical and horizontal directions respectively, it is upsampled to the original size.

As described above, the present invention provides a combination of the inverse DCT process of a reduced size of video data and the compression of the video data to be stored in the frame memory, hence allowing the frame memory to be decreased in the storage size.

Figure 10A:
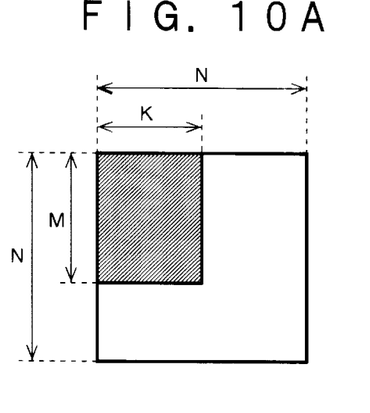
FIGS. 10A and 10B are explanatory views showing examples of the IDCT process in the second or third embodiment.

The action of the K×M IDCT transformer 40 will be explained in more detail referring to FIG. 10A. FIG. 10A illustrates N×N DCT coefficients. In the K×M IDCT transformer 40, K×M DCT coefficients of a low frequency component in the N×N DCT coefficients, K in horizontal by M in vertical, are inverse DCT processed. More specifically, the K×K IDCT process in the horizontal direction and the M×M IDCT process in the vertical direction are performed to produce a K×M pixel block data.

The motion vector converter 12 multiplies the motion vectors MV by K/N in the horizontal and M/N in the vertical thus producing and delivering the scaled down data MV'. Assuming that horizontal and vertical components of MV and MV' are MVx, MVx' and MVy, MVy', the following equations are established:

$$MVx'=MVx \times K/N$$

$$MVy'=MVy \times M/N$$

However, the accuracy of calculation depends on the accuracy of decimal fractions as well as the accuracy of integers. The motion compensation will thus be increased in the accuracy to as a high level as a decimal fraction level of MPEG format.

The upsampler 41 converts the decoded video data to a desired size. For example, the upsampling of the decoded video data by N/K and N/M in the vertical and horizontal directions respectively will produce the original size. The upsampling may be realized by linear interpolation.

It is assumed that three consecutive pixels R0, R1, and R2 are converted to a group of four pixels Q0, Q1, Q2, and Q3, these pixels Q0, Q1, Q2, and Q3 are calculated from ratio of distances between R0, R1, and R2 as expressed by:

$$Q0=R0, Q1=\tfrac{1}{3}R0+\tfrac{2}{3}R1, Q2=\tfrac{2}{3}R1+\tfrac{1}{3}R2, Q3=R2$$

Figure 9:
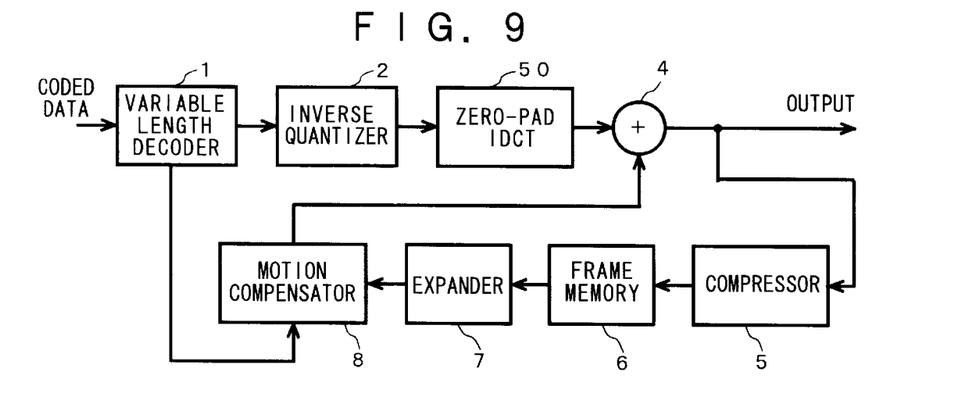
FIG. 9 is a block diagram of a third embodiment of the decoder according to the present invention.
Figure 10B:
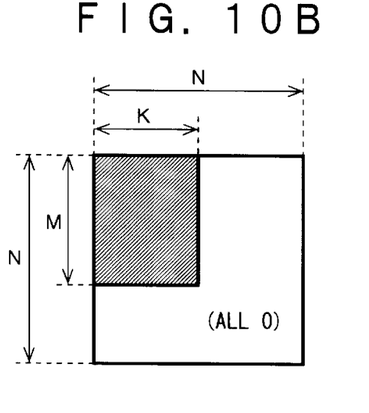

FIG. 9 is a block diagram showing a third embodiment of the decoder of the present invention. Video data of e.g. MPEG 2 coded form is variable length decoded by a variable length decoder 1 and resultant quantized DCT coefficients are inverse quantized by an inverse quantizer 2 to produce an N×N DCT coefficients. In a zero-pad inverse DCT (0 pad IDC) 50, other than a low frequency or K×M component of the N×N DCT coefficients from the inverse quantizer 2 is filled with 0s for IDCT process of the N×N data, reconstructing N×N pixels. FIG. 10B is an explanatory view of the zero-pad inverse DCT process. The zero-pad IDCT 50 performs an N×N IDCT process assigning 0 to the coefficients other than K×M coefficients in the low frequency range of the N×N DCT data, thus reconstructing a N×N pixel data. If the block data to be decoded is motion compensation blocks, the motion compensation blocks supplied from a motion compensater 8 are combined by an adder 4 with the N×N data hence reconstructing a video data to be decoded.

The decoded video data is then compressed by a compressor 5 and saved in a frame memory 6. Pixels in the compensation blocks of a resultant compressed video data are decoded by an expander 7 when motion compensation is requested and fed to a motion compensator 8 for the motion compensation process. According to this embodiment, the video data is IDCT processed by filling a given area with 0s and its compressed, reduced form is saved in the frame memory 6 which can hence be decreased in the storage size. The arrangement of the third embodiment permits reduction of a high-frequency component from the differential image data released by the inverse DCT transformer and thus satisfies the accuracy of the reduced video data to be stored in the frame memory 6.

Figure 11:
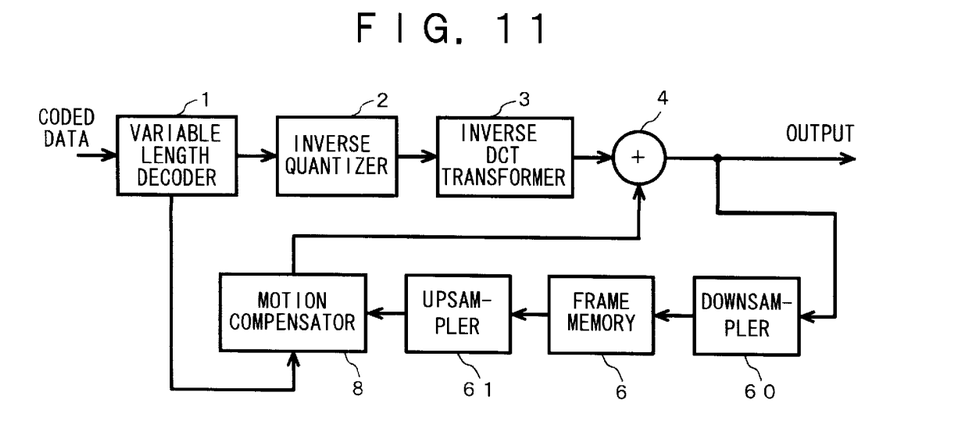
FIG. 11 is a block diagram of a fourth embodiment of the decoder according to the present invention.

FIG. 11 is a block diagram showing a fourth embodiment of the decoder of the present invention. Video data of e.g. MPEG2 coded format is variable length decoded by a variable length decoder 1 and resultant quantized DCT coefficients are inverse quantized by an inverse quantizer 2 to produce N×N DCT coefficients. In an IDCT 3, the N×N DCT coefficients are IDCT processed to an N×N pixel data. If the block data to be decoded is motion compensation blocks, the motion compensation blocks are retrieved from a motion compensator 8 and combined with the N×N pixel data.

The decoded data is reduced in data size by a down sampler 60 and stored in a frame memory 6. When the motion compensation is requested, the reduced pixel data is recovered all pixels in the blocks by an upsampler 61 before fed to the motion compensator 8.

The downsampler 60 samples, for example, every SNth pixel (SN>0, SN being an integer) while eliminating the other pixels so that the pixel data is reduced at 1:SN. Accordingly, the pixel data is reduced to 1/SN before saved in the frame memory. The upsampler 61 recovers the eliminated pixel data by e.g. linear interpolation. For example, if X0 and X3 of the pixel data are stored in the frame memory 6, X1 and X2 are recovered by calculating the ratio of distance between X0 and X3 as expressed by:

$$X1=\tfrac{2}{3}X0+\tfrac{1}{3}X3, X2=\tfrac{1}{3}X0+\tfrac{2}{3}X3$$

Figure 12:
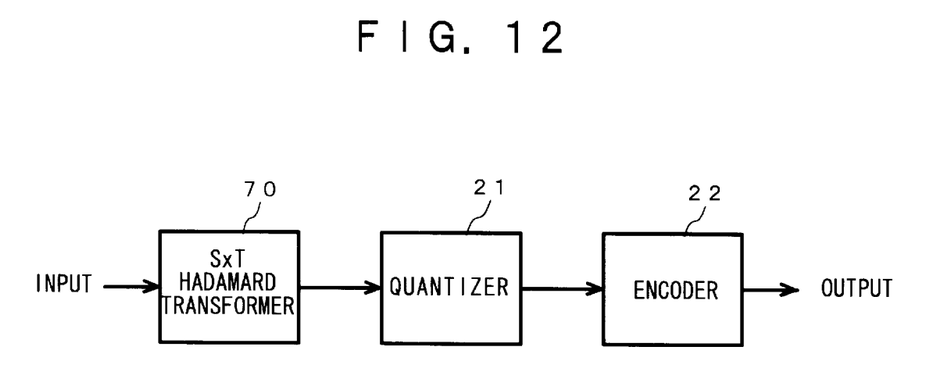
FIG. 12 is a block diagram of a compressor 5 in a fifth embodiment.
Figure 13:
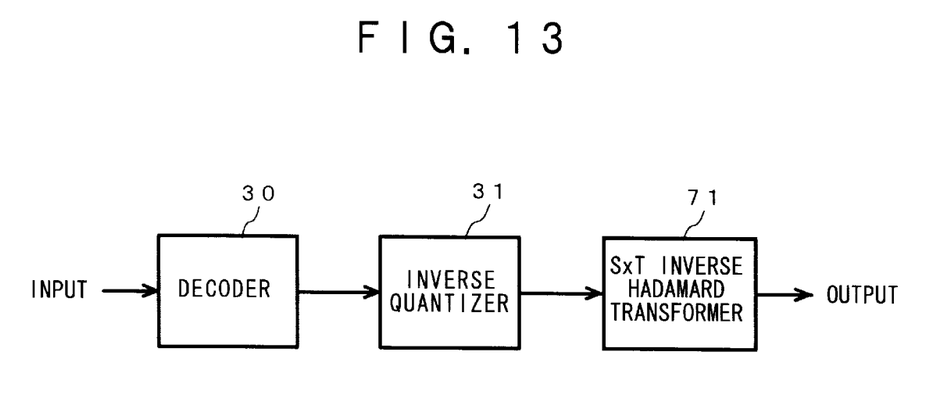
FIG. 13 is a block diagram of an expander 7 in the fifth embodiment.

FIGS. 12 and 13 are block diagrams showing primary parts of a fifth embodiment of the decoder of the present invention. The fifth embodiment is a modification of the first embodiment of FIG. 1 in which the compressor 5 and the expander 7 are modified as shown in FIGS. 12 and 13 respectively. FIG. 12 illustrates a construction of the compressor 5 according to the fifth embodiment. An S×T Hadamard transformer 70 is provided for Hadamard transforming every S×Tth block of the pixel data (S and T being positive integers) to output a frequency-domain data. The output data is then quantized by a quantizer 21 and encoded by an encoder 22. The quantizer 21 and the encoder 22 may be similar to those explained in the first embodiment. It is also possible that the quantization step Q of the quantizer 21 is varied depending on the location and size of factors in each block.

FIG. 13 illustrates a construction of the expander 7 according to the fifth embodiment. Compressed video data saved in the frame memory 6 is decoded of its quantized coefficients by a decoder 30 and converted by an inverse quantizer 31 to a frequency-domain data in each SxTth block. The frequency-domain data is decoded by an SxT inverse Hadamard transformer 71 to the original image data. The decoder 30 and the inverse quantizer 31 may be similar to those of the first embodiment. The Hadamard transformation in the fifth embodiment may be substituted by another orthogonal transform method such as DCT.

Although the preferred embodiments of the present invention have been described, further modifications are possible as will be described below. The transformation may be implemented by any other applicable method such as Wavelet transform than the popular DCT.

The embodiments of the present invention are not limited to the use of a quantizer and other equivalent devices may be utilized for enabling loss-less coding (which allows perfect reconstruction of data).

Each functional block of the present invention may be realized by software running on a computer of e.g. a personal or workstation type or by hardware such as an LSI.

As set forth above, the present invention allows the storage size of the frame memory to be decreased by a combination of compression of pixel data to be saved in the frame memory and IDCT processing in a reduced block size, successfully attenuating unwanted drift noise and minimizing declination of the resolution as compared with the conventional frame memory size reducing methods.

For example, a test video data (of the flower garden) defined by ISO was compressed by a sampling rate of 2 to 6 Mbit/s of MPEG2 format with the decoder of the present invention having a frame memory of which storage size is reduced to ½ in horizontal. The result of decoding in the second embodiment yielded as a higher gain as 1.5 to 4.5 dB than that of the conventional methods. Also, it was found that the declination of the resolution is insignificant and the drift noise is remarkably attenuated.

What is claimed is:

1. An apparatus for decoding coded video data with reduced memory size comprising:
    a data size reducing means for reducing the size of a decoded video data;
    a storing means for storing a reduced data size decoded video outputted from said data size reduction means;
    a data size recovering means for recovering the original size of the decoded video from said reduced data size decoded video outputted from said storing means; and
    a motion compensation means for predicting a motion compensated image for said original size of the video data outputted from said data size recovering means,
    wherein the data size reducing means is a subsampler for subsampling video data by using one of neighbor pixel data on the left, pixel data encoded without prediction, and two pixel data encoded without prediction on the both sides and the data size recovering means is an interpolating means.

2. An apparatus for decoding coded video data with reduced memory size comprising:
    a data size reducing means for reducing the size of a decoded video data;
    a storing means for storing a reduced data size decoded video outputted from said data size reduction means;
    a data size recovering means for recovering the original size of the decoded video from said reduced data size decoded video outputted from said storing means; and
    a motion compensation means for predicting a motion compensated image for said original size of the video data outputted from said data size recovering means,
    wherein the data size reducing means is a compressing means comprising means for encoding pixel difference of said decoded video data and prediction data from a prediction means, and said data size recovering means is an expanding means comprising means for recovering said original size video data by adding said pixel difference by decoding said reduced data size video to prediction data from the prediction means.

3. An apparatus for decoding coded video data with reduced memory size according to claim 2, further comprising:
    a quantizing means for quantizing said encoded pixel difference and outputting to the storing means; and
    an inverse quantizing means for inverse quantizing said quantized pixel difference from the storing means.

4. An apparatus for decoding coded video data with reduced memory size comprising:
    a data size reducing means for reducing the size of a decoded video data;
    a storing means for storing a reduced data size decoded video outputted from said data size reduction means;
    a data size recovering means for recovering the original size of the decoded video from said reduced data size decoded video outputted from said storing means; and
    a motion compensation means for predicting a motion compensated image for said original size of the video data outputted from said data size recovering means,
    wherein the data size reducing means is a compressing means comprising means for compressing blocks of said decoded video data by DCT process and means for coding transformed coefficients by encoder, and said data size recovering means is an expanding means comprising means for decoding encoded transform coefficients by decoder and means for recovering said original size video data by inverse DCT process for said reduced data size video.

5. An apparatus for decoding coded video data with reduced memory size according to claim 4, further comprising:
    a quantizing means for quantizing said transformed coefficients, and outputting to the storing means; and
    an inverse quantizing means for inverse quantizing quantized transformed coefficients from the storing means.

6. An apparatus for decoding coded video data with reduced memory size comprising:
    a data size reducing means for reducing the size of a decoded video data;
    a storing means for storing a reduced data size decoded video outputted from said data size reduction means;
    a data size recovering means for recovering the original size of the decoded video from said reduced data size decoded video outputted from said storing means; and
    a motion compensation means for predicting a motion compensated image for said original size of the video data outputted from said data size recovering means, wherein the data size reducing means selects pixels in said decoded video data cyclically and eliminates the other pixels, and the data size recovering means recovers the selected data read out from said storing means.

7. An apparatus for decoding decoded video data with reduced memory size comprising:

an inverse transforming means for inverse transforming a low-frequency component of coded video data produced by video data compression process with a transform encoding;

a decoder for decoding the inverse transformed low-frequency component of coded video data;

a data size reducing means for recovering a size of a decoded video data by the decoder;

a storing means for storing a reduced data size decoded video outputted from said data size reduction means;

a data size recovering means for recovering a size of the low-frequency component from said reduced data size decoded video outputted from said storing means;

a motion compensation means for predicting a motion compensated image for the low-frequency component of the video data outputted from said data size recovering means; and a resolution converting means for converting video data of decoded form to a desired degree of resolution for display.

8. An apparatus for decoding coded video data with reduced memory size according to claim 7, wherein the data size reducing means is a subsampler, and the data size recovering means is an interpolating means.

9. An apparatus for decoding coded video data with reduced memory size according to claim 7, wherein the transform encoding process is DCT and the inverse transforming means is an inverse DCT.

10. An apparatus for decoding coded video data with reduced memory size comprising:

an inverse DCT means for inverse transforming coded video data produced by video data compression with a transform encoding;

a 0 assigning means for assigning other than a low-frequency component of the coded video data to 0;

a decoder for decoding the inverse transformed data assigned other than a low-frequency component of coded video data to 0;

a data size reducing means for reducing the size of a decoded video data by the decoder;

a storing means for storing a reduced data size decoded video outputted from said data size reduction means;

a data size recovering means for recovering a size of the low-frequency component from said reduced data size decoded video outputted from said storing means;

a motion compensation means for predicting a motion compensated image for the low-frequency component of the video data outputted from said data size recovering means; and a resolution converting means for converting video data of decoded form to a desired degree of resolution for display.

* * * * *